US010331145B2

(12) United States Patent
Duffy

(10) Patent No.: US 10,331,145 B2
(45) Date of Patent: Jun. 25, 2019

(54) POSITIVE SEALING PROPORTIONAL CONTROL VALVE WITH SEALABLE VENT VALVE

(71) Applicant: Stanadyne LLC, Windsor, CT (US)

(72) Inventor: Mark Raymond Duffy, Rochester Hill, MI (US)

(73) Assignee: Stanadyne LLC, Windsor, CT (US)

( * ) Notice: Subject to any disclaimer, the term of this patent is extended or adjusted under 35 U.S.C. 154(b) by 202 days.

(21) Appl. No.: 15/419,071

(22) Filed: Jan. 30, 2017

(65) Prior Publication Data

US 2018/0217619 A1    Aug. 2, 2018

(51) Int. Cl.
| F16K 17/04 | (2006.01) |
| G05D 16/20 | (2006.01) |
| F02M 59/46 | (2006.01) |
| F16K 31/122 | (2006.01) |
| F16K 31/42 | (2006.01) |
| F02M 59/36 | (2006.01) |

(52) U.S. Cl.
CPC ....... *G05D 16/2093* (2013.01); *F02M 59/367* (2013.01); *F02M 59/464* (2013.01); *F02M 59/466* (2013.01); *F16K 17/0406* (2013.01); *F16K 31/1221* (2013.01); *F16K 31/42* (2013.01)

(58) Field of Classification Search
CPC .. F16K 31/42; F16K 17/0406; F16K 31/1221; G05D 16/2093
See application file for complete search history.

(56) References Cited

U.S. PATENT DOCUMENTS

| 4,565,209 | A | * | 1/1986 | Ruchser | ............ G05D 16/2093 137/116.3 |
| 5,597,013 | A | * | 1/1997 | Ushakov | ................. F16K 31/42 137/596.16 |
| 6,345,609 | B1 | | 2/2002 | Djordjevic | |
| 6,792,916 | B2 | | 9/2004 | Oashi | |
| 8,807,168 | B2 | * | 8/2014 | Lovell | ................. F15B 13/0405 137/596.14 |
| 9,828,958 | B2 | * | 11/2017 | Saito | ...................... F02M 55/04 |
| 2012/0134847 | A1 | | 5/2012 | Conley et al. | |
| 2014/0255219 | A1 | | 9/2014 | Lucas | |

FOREIGN PATENT DOCUMENTS

GB    2488929 A    9/2012

OTHER PUBLICATIONS

International Searching Committee, International Search Report and Written Opinion (PCT/US2018/015724) dated Apr. 20, 2018.

* cited by examiner

*Primary Examiner* — Kevin L Lee
(74) *Attorney, Agent, or Firm* — Alix, Yale & Ristas, LLP

(57) ABSTRACT

The proportional control valve for a fuel pump has a metering assembly within a tightly fit bore and a vent valve. The metering assembly includes a metering piston assembly, a piston biasing spring, an armature and a vent valve. The vent valve, such as a ball, is affixed to the armature and the metering piston assembly is configured around the vent valve in a manner that couples the metering piston to the armature. The metering piston assembly comprises a metering piston and a vent valve seat, permanently joined together, which contain a seal and a seat surface respectively between which the vent valve is permitted to move during the operation of the proportional control valve.

18 Claims, 5 Drawing Sheets

POSITIVE SEALING PROPORTIONAL CONTROL VALVE WITH SEALABLE VENT VALVE

BACKGROUND

The present invention relates to gasoline fuel injection pumps for delivering high pressure fuel to a common rail.

Gasoline Direct Injection (GDI) fuel systems must regulate the fuel volume delivered to the common rail as part of an overall pressure management strategy. Two strategies are currently employed for controlling the quantity of fuel delivered to the pumping chamber and thus the degree to which the common rail is pressurized. One strategy uses a digital on/off solenoid such as disclosed in U.S. Pat. No. 7,707,996 and another uses a proportional valve such as disclosed in U.S. Pat. No. 6,792,916.

In cases where a proportional control valve is preferred there is a risk of diminished valve performance experienced as slowed response times and loss of functional stroke length due to the entrapment of fuel in the fluid chamber of the proportional control valve on the non-functional side of the metering piston. Fuel can become trapped in the inert volume of the valve by leakage through many potential paths, but is most likely to occur by leakage past the metering piston from the pump supply when pressure in the control valve rises in response to the operation of the pumping mechanism permitted by the finite response time of the inlet check valve. As fuel accumulates in the inert volume of the proportional control valve it will begin to retard the motion of the proportional control valve by requiring the valve to either pressurize that trapped fluid on pull-in or expel it through the same highly restricted leakage paths it entered through. This ultimately necessitates a solenoid and proportional valve system that produces more force on the piston and increases cost.

SUMMARY

The disclosed apparatus relieves pressure trapped within a proportional control valve. This reduces risk of proportional control valve failure, improves response time, and permits the use of a weaker actuator mechanism.

The proportional control valve comprises a metering assembly within a tightly fit bore acted on by an armature biasing spring and a control solenoid. This metering assembly comprises a metering piston assembly, a piston biasing spring, an armature and a vent valve. The vent valve, such as a ball, is affixed to the armature and the metering piston assembly is configured around the vent valve in a manner that couples the metering piston to the armature. The metering piston assembly comprises a metering piston and a vent valve seat, permanently joined together, which contain a seal and a seat surface respectively between which the vent valve is permitted to move during the operation of the proportional control valve.

When zero control signal is given to the solenoid the armature biasing spring will push the metering assembly to the home position and fully close the variable orifice for supplying fuel to the metering end of piston. The armature biasing spring will also overcome the load on the piston biasing spring and cause the ball to contact the sealing face internal to the metering piston. In this position the proportional valve is fully closed, allowing zero flow to the pumping chamber.

As a command to deliver fuel is received the solenoid enters an energized state which will begin to lift the armature assembly, overcoming the armature biasing spring and lifting the metering assembly. Initially, the armature will travel in response to the control signal while the metering piston remains in the home position until the piston biasing spring causes the vent valve to contact the stop face internal to the metering piston assembly. As the vent valve lifts a small flow passage will be opened between an inert internal volume of the proportional control valve and the plenum, relieving any trapped pressure within that inert volume. Once the ball has contacted the stop face within the piston the piston will lift in response to a solenoid signal and flow into the pumping chamber can be delivered by increasing the open area of the variable orifice. The piston biasing spring holds the ball against the piston stop and prevents unintended motion between the piston and pin.

One embodiment is directed to a proportional control valve for a fuel pump, comprising an inlet check valve cooperating with a valve seat, wherein the inlet check valve has a closed position against the seat during a pumping phase and variable open position to permit hydraulic flow through the seat to a low pressure passage in the pump during a charging phase of the pump. A main spring acts on the inlet check valve to provide a biasing force toward the seat. A hydraulic plenum acts on the other side of the check valve, in opposition to the main spring, whereby when a force on the check valve due to pressure in the plenum exceeds the biasing force of the main spring on the check valve during the charging phase, the check valve opens, permitting hydraulic flow to the pressure passage.

A sleeve defines a piston bore, and an inlet port or orifice passes transversely through the sleeve into the piston bore. A feed plenum supplies fuel to the inlet port at a pressure higher than the pressure in the low pressure passage. A metering piston is slideable within the piston bore along a first direction to a zero metering first position that covers the port and along a second opposite direction to a variable metering second position that variably opens the flow path to the plenum and port, whereby the plenum applies hydraulic feed pressure to the upstream side of the inlet check valve. An actuator connected to the piston selectively slides the piston between the first and second positions.

A closed fluid chamber is situated at the non-metering end of the piston, and a leakage path is present along the bore of the sleeve, from the inlet port to the fluid chamber. A vent valve is provided between the plenum and the fluid chamber, connected to the actuator, for exposing the fluid chamber to the pressure in the plenum before the actuator moves the piston from the first to a second position.

DETAILED DESCRIPTION

Figure 1:
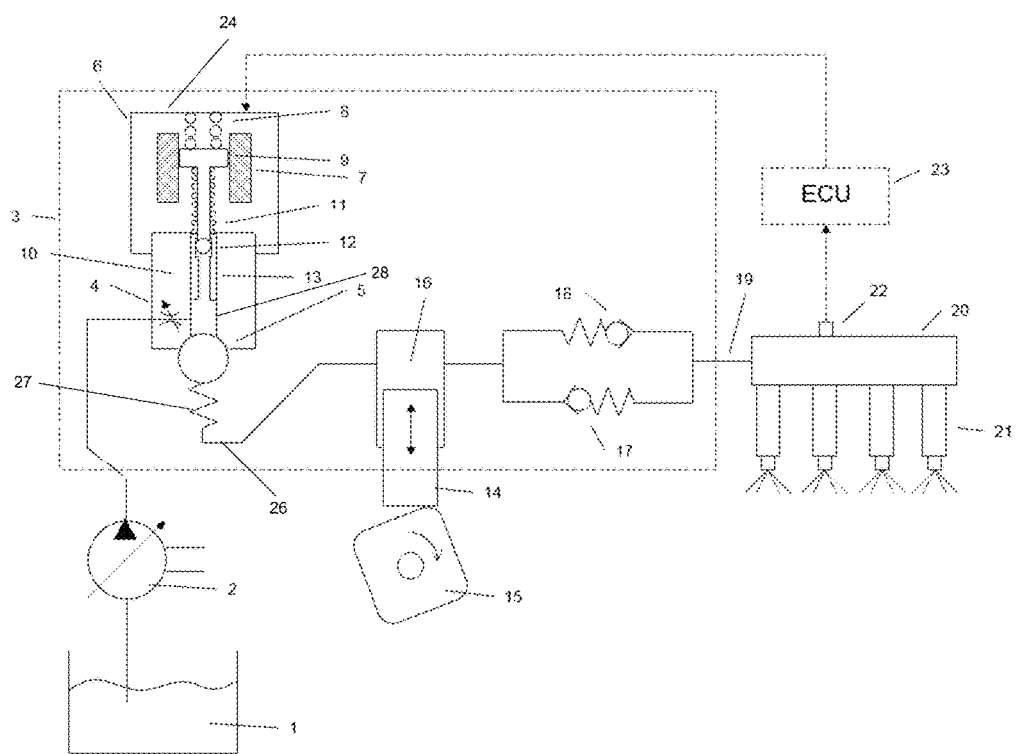
FIG. 1 shows a system schematic in which the invention is embodied.
Figure 2:
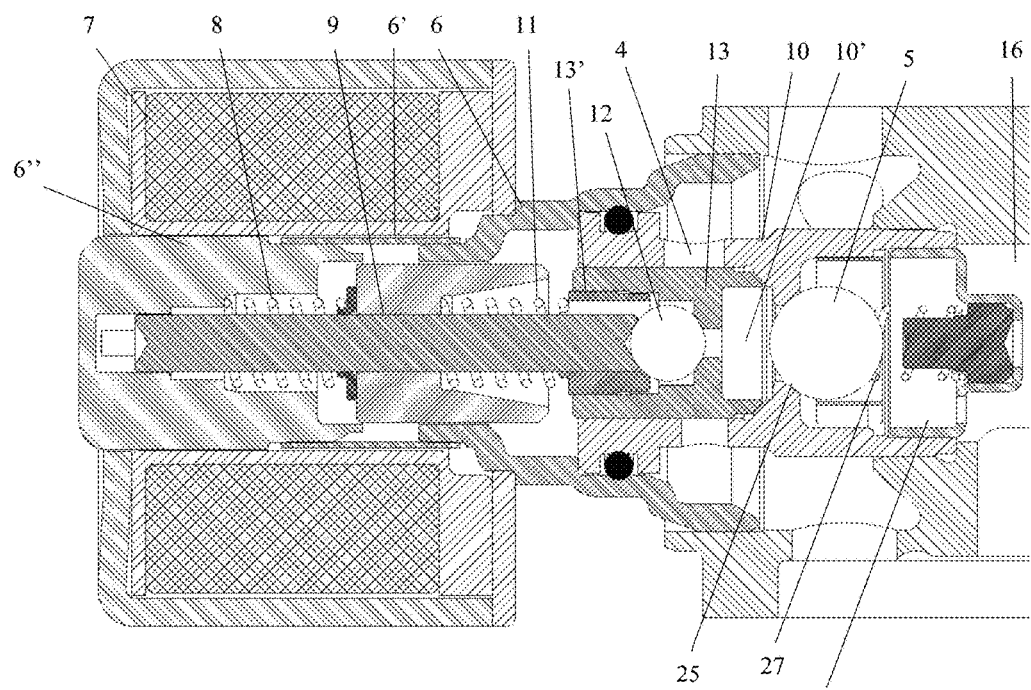
FIG. 2 shows an exemplary implementation of this invention, with the metering piston in the closed position and the vent valve closed.
Figure 3:
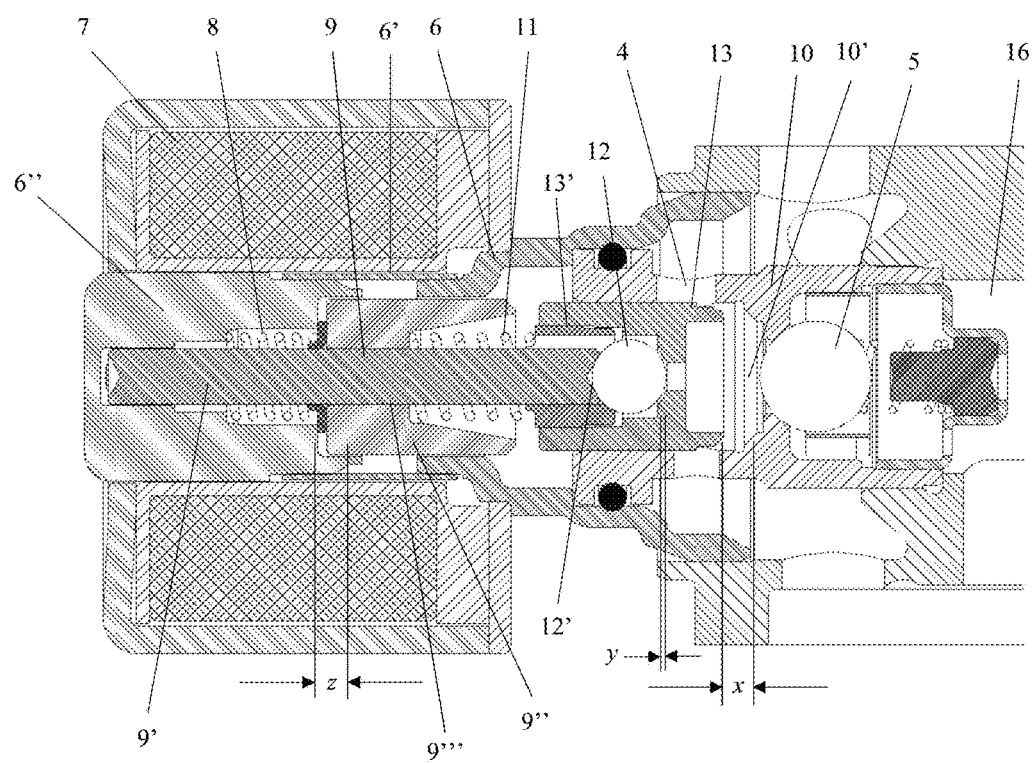
FIG. 3 shows the exemplary metering piston in a fully open metering position, with the vent valve open.

FIGS. 1 through 3 show a proportional control valve 24 including a feed pump 2 that draws fuel from the fuel tank 1 and pumps it through the chassis fuel line and into the inlet of the high pressure GDI pump 3. The fuel then flows through a passage transverse to the sleeve 10 into piston bore 28, in the form of an inlet port 4, then through the inlet check valve 5 and into the pumping chamber 16 during the charging stroke of the pumping plunger 14. A main spring 27 acts on the inlet check valve 5 to provide a biasing force toward a check valve seat 25. During the pumping stroke, the pumping plunger 14 is driven by the engine cam 15 (usually through a lifter, not shown), thereby compressing the fuel in the pumping chamber 16. The compressed fuel then flows through the outlet check valve 17, high pressure line 19 and into the fuel rail 20 The fuel injectors 21 spray atomized fuel into the engine combustion chamber (not shown), and are electronically controlled via the engine ECU 23. The ECU 23 uses predetermined algorithms or data relationships for injector 21 as well as a signal from the pressure sensor 22 to determine the appropriate current level to send to the proportional solenoid 7 of the inlet metering valve.

The proportional solenoid 7 generates a magnetic force that moves the actuator 9, compressing the inlet metering valve biasing spring 8. The actuator 9, including rod 9' and armature 9", is joined to the vent valve 12 at interfaces 9'" and 12' by welding or the like and linked to the metering piston 13 and vent valve seat 13' by the vent valve 12 and the piston biasing spring 11. This results in linking the motion of the metering piston 13 to the motion of the actuator 9 unless the metering piston 13 is at the fully closed position. The position of the metering piston 13 in response to the proportional solenoid 7, inlet metering valve biasing spring 8 and piston biasing spring 11 varies the size of the inlet port 4, thereby controlling the flow rate through the high pressure pump.

In the execution shown, the size of the inlet port 4 is varied by a step in the side of the metering piston 13 which covers some portion of a narrow feed slot on the side of the piston bore 28 within the sleeve 10. A leakage path 33 is included along the piston bore 28 of the sleeve 10 from the inlet port 4 to the fluid chamber. Higher current levels supplied to the solenoid 7 cause additional advancement of the metering piston 13, until the inlet port 4 is fully open, and ideally delivers no fuel when zero signal is commanded.

It is necessary to have a fully sealed metering valve housing 6, 6', and 6" in order to avoid exhausting fuel into the engine compartment through the pump. The fluid chamber around the solenoid which the actuator 9 and metering piston 13 travel through and which contains the inlet metering valve biasing spring 8, actuator 9, piston biasing spring 11, the vent valve seat 13', and one end of the sleeve 10 can become pressurized due to the leakage past the metering piston 13 from the inlet port 4. This can restrict the motion of the metering piston 13 by requiring it to pressurize this trapped fluid if high flow is commanded and could ultimately result in hydraulic locking of the metering piston 13.

This is alleviated by the use of vent valve 12 which permits a flow path between the fluid chamber within the metering valve housing 6, 6', and 6" and the hydraulic plenum 10' within the sleeve 10 between the inlet port 4 and the inlet check valve 5. This allows for the metering piston 13 to move without pressurizing any fluid trapped within the metering valve housing 6, 6', and 6". When zero flow is commanded the vent valve 12 will seal within the metering piston 13 and the metering piston 13 will seal against the sleeve 10, fully isolating the hydraulic plenum 10', inlet port 4, and the fluid volume within the metering valve housing 6, 6' and 6".

Figure 4:
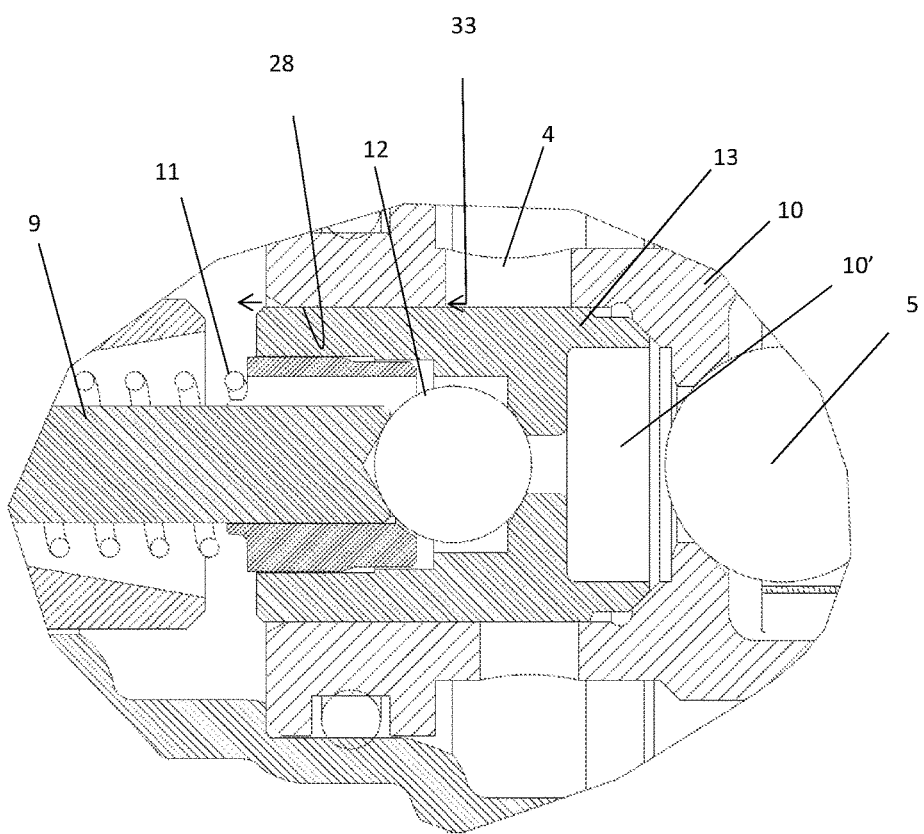
FIGS. 4 and 5 show detailed views corresponding to FIGS. 2 and 3, respectively.
Figure 5:
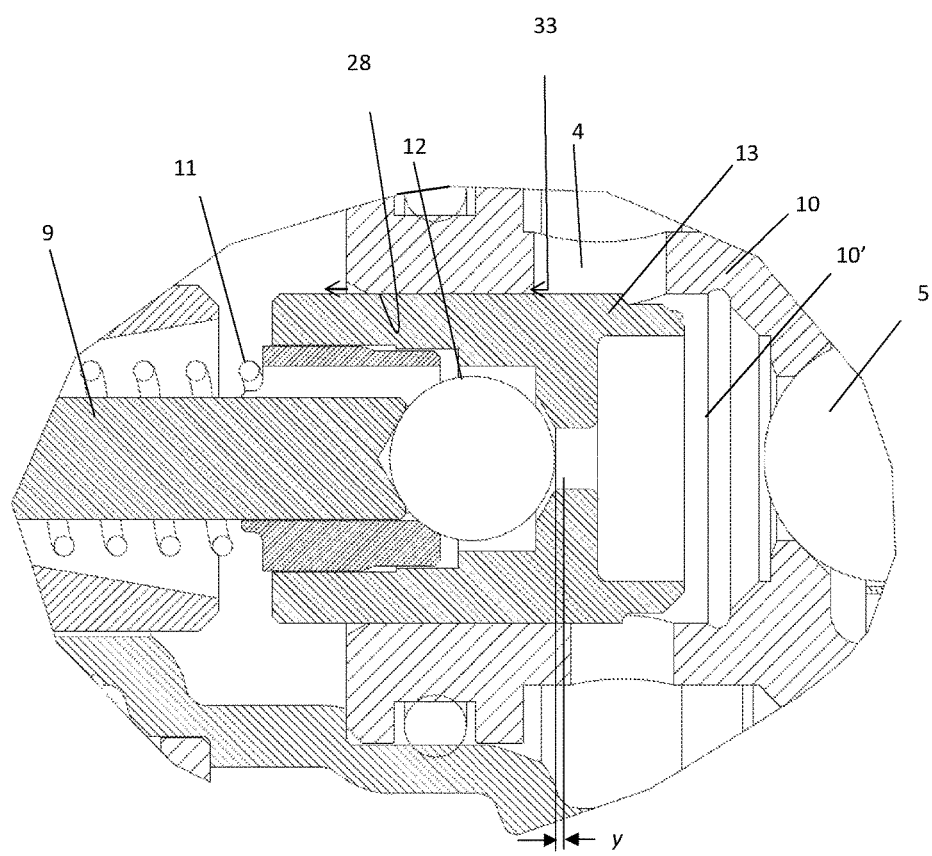

FIGS. 2 and 3 show an exemplary implementation with FIGS. 4 and 5 presenting detailed views of the vent valve 12, metering piston 13 and vent valve seat 13' assembly. FIGS. 2 and 4 show the proportional control valve 24 at the first position, where no fuel delivery is commanded by the ECU 23. In the exemplary implementation shown, no fuel command is realized as zero current signal to the proportional solenoid 7. In this position the force due to the inlet metering valve biasing spring 8 pushes the actuator 9 with enough force to overcome the piston biasing spring 11, sealing the vent valve 12 against the metering piston 13 and moving the metering piston 13 to its zero current position, fully closing the inlet port 4.

FIGS. 3 and 5 show the same valve at full open across a stroke 'X' consisting of the overall actuator stroke CZ' less the vent valve 12 stroke 'Y'. This condition occurs when the ECU 23 has commanded maximum flow to the proportional solenoid 7. In this position the metering piston 13 is allowing maximum flow through the inlet port 4 and the actuator 9 has lifted the vent valve 12 from the sealing surface to the vent valve seat 13'. By design, the stroke 'Y' of the vent valve 12 is small.

The invention claimed is:

1. A proportional control valve for a fuel pump, comprising:
   an inlet check valve subject to a biasing force against a confronting seat;
   an inlet port for providing feed fuel to a hydraulic plenum that acts on said inlet check valve, in opposition to said biasing force;
   a metering piston having a metering end in selective fluid communication with said inlet port and said hydraulic plenum and a non-metering end in fluid communication with an inlet fluid chamber;
   an actuator connected to the metering piston for selectively displacing the metering piston between positions that open and close said inlet port, whereby the opening of the inlet port establishes a flow path from said inlet port to said hydraulic plenum such that feed fuel lifts the inlet check valve from said seat;
   a leakage path from the inlet port to said fluid chamber; and
   a vent valve between the hydraulic plenum and the fluid chamber, connected to the actuator, for exposing the fluid chamber to the pressure in the hydraulic plenum before the actuator opens said inlet port.

2. The proportional control valve of claim 1, wherein
   the metering piston has a profiled longitudinal through bore between the fluid chamber and said hydraulic plenum, with said profiled longitudinal through bore including a vent valve seat;
   the vent valve is situated in the profiled longitudinal through bore, confronting said vent valve seat;
   the actuator includes a stem connected to the vent valve; and
   the vent valve is biased against the vent valve seat with a lower force than is required for the actuator to move the metering piston from the first position.

3. The proportional control valve of claim 1, wherein the vent valve has a stroke (Y), the actuator has a stroke (Z), and the stroke (Y) of the vent valve is less than the stroke (Z) of the actuator.

4. The proportional control valve of claim 1, wherein the vent valve has a stroke (Y), the metering piston has a stroke (X), and the stroke (Y) of the vent valve is less than the stroke (X) of the metering piston.

5. The proportional control valve of claim 1, wherein
   the metering piston has a stroke (X), the vent valve has a stroke (Y), and the actuator has a stroke (Z); and the stroke (Y) of the vent valve is less than the stroke (X) of the metering piston; and the stroke (Y) of the vent valve is less than the stroke (Z) of the actuator.

6. The proportional control valve of claim 1, wherein the vent valve is in the form of a ball joined to the actuator.

7. The proportional control valve of claim 1, wherein the displacement of the metering piston in a first direction toward a first position from one second position to another second position increasingly restricts a flow path from said inlet port to said hydraulic plenum such that said hydraulic plenum applies a reduced hydraulic feed pressure to the upstream side of the inlet check valve.

8. The proportional control valve of claim 1, wherein the actuator is driven by a proportional electromagnetic solenoid.

9. A proportional control valve for a fuel pump, comprising:
- an inlet check valve cooperating with a valve seat, wherein the inlet check valve has a closed position against said seat during a pumping phase of said pump and a variable open position to permit hydraulic flow through the seat in a downstream direction to a passage in the pump during a charging phase of the pump;
- a main spring that acts on a downstream side of said inlet check valve to provide a biasing force on the inlet check valve toward said seat;
- a hydraulic plenum that acts on the upstream side of said inlet check valve, in opposition to said first main spring, whereby when a force on the inlet check valve due to pressure in the hydraulic plenum exceeds the biasing force of the main spring on the inlet check valve during the charging phase, the inlet check valve opens, permitting hydraulic flow to said passage;
- a sleeve with upstream and downstream ends, defining a piston bore and an inlet port passing transversely through the sleeve into the piston bore;
- a feed plenum for supplying fuel at a pressure higher than the pressure in said passage, to said inlet port;
- a metering piston having metering and non-metering ends, slidable within the piston bore along a first direction to a first position that covers said inlet port and seals a flow path to said hydraulic plenum and along a second opposite direction to a variable second position that respectively variably opens said flow path to said hydraulic plenum and said inlet port, whereby the opening of the inlet port establishes a flow path from said inlet port to said hydraulic plenum such that the hydraulic plenum applies hydraulic feed pressure to the upstream side of the inlet check valve;
- an actuator connected to the metering piston for selectively sliding the metering piston between said first and second positions;
- a fluid chamber at the non-metering end of the metering piston;
- a leakage path along the piston bore from the inlet port to said fluid chamber;
- a vent valve between the hydraulic plenum and the fluid chamber, connected to the actuator, for exposing the fluid chamber to the pressure in the hydraulic plenum before the actuator moves the metering piston from the first to a second position.

10. The proportional control valve of claim 9, wherein the hydraulic plenum is formed at the metering end of the metering piston and the metering end of the metering piston includes a seal against the sleeve, between the inlet port and the hydraulic plenum.

11. The proportional control valve of claim 9, wherein
the metering piston has a profiled longitudinal through bore between the fluid chamber and said hydraulic plenum, with said profiled longitudinal through bore including a vent valve seat;
a vent valve is situated in the profiled longitudinal through bore, confronting said vent valve seat;
the actuator includes a stem connected to the vent valve; and
the vent valve is biased against the vent valve seat with a lower force than is required for the actuator to move the piston from the first position.

12. The proportional control valve of claim 9, wherein the vent valve has a stroke (Y), the actuator has a stroke (Z), and the stroke (Y) of the vent valve is less than the stroke (Z) of the actuator.

13. The proportional control valve of claim 9, wherein the vent valve has a stroke (Y), the metering piston has a stroke (X), and the stroke (Y) of the vent valve is less than the stroke (X) of the metering piston.

14. The proportional control valve of claim 9, wherein
the metering piston has a stroke (X), the vent valve has a stroke (Y), and the actuator has a stroke (Z); and
the stroke (Y) of the vent valve is less than the stroke (X) of the metering piston; and
the stroke (Y) of the vent valve is less than the stroke (Z) of the actuator.

15. The proportional control valve of claim 9, wherein the vent valve is in the form of a ball joined to the actuator.

16. The proportional control valve of claim 9, wherein the displacement of the metering piston in the first direction toward said first position from one second position to another second position increasingly restricts a flow path from said inlet port to said hydraulic plenum such that said hydraulic plenum applies a reduced hydraulic feed pressure to the upstream side of the inlet check valve.

17. The proportional control valve of claim 9, wherein the actuator is driven by a proportional electromagnetic solenoid.

18. The proportional control valve of claim 9, wherein
the hydraulic plenum is formed at the metering end of the metering piston and the metering end of the metering piston includes a seal against the sleeve, between the inlet port and the hydraulic plenum
the metering piston has a profiled longitudinal through bore between the fluid chamber and said hydraulic plenum, with said bore profile including a vent valve seat;
a vent valve is situated in the profiled bore, confronting said vent valve seat;
the actuator is driven by a proportional solenoid and includes a stem joined to the vent valve;
and the vent valve is biased against the vent valve seat with a lower force than is required for the actuator to move the metering piston from the first position;
the metering piston has a stroke (X), the vent valve has a stroke (Y), and the actuator stem has a stroke (Z);
the stroke (Y) of the vent valve is less than the stroke (X) of the metering piston; and
the stroke (Y) of the vent valve is less than the stroke (Z) of the actuator stem.

* * * * *